US 6,608,563 B2

(12) United States Patent
Weston et al.

(10) Patent No.: US 6,608,563 B2
(45) Date of Patent: Aug. 19, 2003

(54) SYSTEM FOR AUTOMATED PHOTO CAPTURE AND RETRIEVAL

(75) Inventors: Denise Chapman Weston, Wakefield, RI (US); Thomas J. Lochtefeld, La Jolla, CA (US)

(73) Assignee: Creative Kingdoms, LLC, RI (US)

( * ) Notice: Subject to any disclaimer, the term of this patent is extended or adjusted under 35 U.S.C. 154(b) by 45 days.

(21) Appl. No.: 09/770,841

(22) Filed: Jan. 26, 2001

(65) Prior Publication Data

US 2002/0008622 A1 Jan. 24, 2002

Related U.S. Application Data

(60) Provisional application No. 60/178,233, filed on Jan. 26, 2000.

(51) Int. Cl.[7] .............................................. G08B 23/00
(52) U.S. Cl. ............................... 340/573.1; 340/573.4; 340/572.1
(58) Field of Search ...................... 340/573.1, 573.2, 340/573.3, 573.4, 572.1; 386/46, 117; 348/14.01, 14.13; 235/462.45, 462.46

(56) References Cited

U.S. PATENT DOCUMENTS

| 5,396,227 A | * | 3/1995 | Carroll et al. ............ 340/573.4 |
| 5,432,864 A | * | 7/1995 | Lu et al. .................... 340/5.83 |
| 5,587,740 A | | 12/1996 | Brennan ....................... 348/373 |
| 5,623,581 A | | 4/1997 | Attenberg .................... 358/1.6 |
| 5,632,878 A | | 5/1997 | Kitano .......................... 205/70 |
| 5,830,065 A | | 11/1998 | Sitrick ........................... 463/31 |
| 5,853,332 A | | 12/1998 | Briggs .......................... 472/128 |
| 5,913,019 A | | 6/1999 | Attenberg ................... 358/1.18 |
| 5,946,444 A | * | 8/1999 | Evans et al. ................... 386/46 |
| 6,369,908 B1 | | 4/2002 | Frey ............................ 358/1.15 |
| 6,371,375 B1 | * | 4/2002 | Ackley et al. ......... 235/462.45 |

* cited by examiner

*Primary Examiner*—Van Trieu
(74) *Attorney, Agent, or Firm*—Jonathan A. Barney

(57) ABSTRACT

The present invention provides an improved system and method for automated photo/video capture and retrieval using RFID tags containing a unique person and/or group identifier number. The system allows automated capturing and indexing of individual or group photo/video images according to each unique person and/or group identifier. Tags are worn by each park patron during their visit to the park or other entertainment facility. Various readers distributed throughout the park or entertainment facility are able to read the RFID tags. Thus, the unique identifier numbers can be conveniently read and provided to an associated photo/video capture system for purposes of providing indexing of captured photo/video images according to the unique identifiers of all individuals standing within the field of view of the camera. Captured photo images can thus be selectively retrieved and organized into a convenient photo/video album to provide a photo record of a family's or group's adventures at the park or other entertainment facility. Unique picture storybooks can also be created using selected "gag" or "novelty" photo images taken throughout the facility and/or by using digital photo image processing to create a particular desired storybook. Thus, play participants themselves become actual characters in the storybook and participate in the storyline.

7 Claims, 6 Drawing Sheets

SYSTEM FOR AUTOMATED PHOTO CAPTURE AND RETRIEVAL

CROSS REFERENCE TO RELATED APPLICATIONS

This application claims priority under 35 USC §119(e) to U.S. Provisional Patent Application Serial No. 60/178,223 of Denise Weston, filed Jan. 26, 2000.

BACKGROUND OF THE INVENTION

1. Field of the Invention

The present invention relates to automated photo capture and retrieval systems for entertainment facilities and the like and, in particular, to a system and method for automated photo capture and retrieval using unique person identifiers or RFID tags that allow automated capturing and arranging of individual or group photo images into an accessible photo/video album and/or interactive storybook.

2. Description of the Related Art

Family entertainment centers, amusement parks and other facilities are popular venues for providing play and interaction among park patrons playing in, or around the entertainment facilities, rides and/or associated play structures. See, for example, U.S. Pat. No. 5,853,332 to Briggs, incorporated herein by reference. In such play or entertainment environments it is often desirable to provide a means for automated photo capture and retrieval of park and/or ride patrons as they enjoy the park facilities. Thus, for example, it is know to provide systems for automatically capturing photo images of park patrons as they ride on a particular ride and to allow park patrons immediately thereafter to purchase such photo images if they desire.

However, current photo capture and retrieval systems are limited by the inherent difficulty of indexing captured photo images in a manner that allows subsequent access and retrieval of relevant images of a particular individual and/or group of individuals taken by one or more such automated image capturing systems throughout an entertainment facility. Current systems typically provide time-stamp indexing of captured photo images. This limits the flexibility and convenience of such automated photo image capture systems because of the need to know the relevant time stamp for each associated photo image desired to be retrieved.

SUMMARY OF THE INVENTION

The present invention provides an improved system and method for automated photo/video capture and retrieval using unique person identifiers or RFID (Radio Frequency Identification) tags. Such system and method allows automated capturing and indexing of individual or group photo/video images according to each unique person and/or group identifier. Preferably one or more RFID tags are worn by each park patron during their visit to the park or other entertainment facility. Each RFID tag contains a unique person identifier number ("UPIN") which is used to match the particular individual to any relevant captured photo images which include the individual. Optionally, each tag may also include a unique group identifier number ("UGIN") which may be used to match a defined group of individuals to any relevant captured photo images which include any individual(s) within the defined group. Various readers distributed throughout the park or entertainment facility are able to read the RFID tags. Thus, the UPIN and UGIN information can be conveniently read and provided to an associated photo/video capture system for purposes of providing indexing of captured photo/video images according to the UPIN and UGIN of all individuals standing within the field of view of the camera.

The ability to index and retrieve captured photo images according to UPIN and UGIN provides flexibility and convenience to park patrons and increased efficiency and reduced operating costs for the facility owner. It also creates unique opportunities for further value-added image processing, products and services. For example, captured photo images may be selectively retrieved and organized into a convenient photo/video album which provides a photo record of a family's or group's adventures at the park or other entertainment facility. This can be purchased by park patrons in paper/book form or it may be subsequently accessed and/or downloaded by computer over the world-wide-web or other suitable internet system.

Unique picture storybooks can also be provided using selected "gag" or "novelty" photo images taken throughout the facility and/or by using digital photo image processing to create a particular desired storybook. Such picture storybooks provide amusing and entertaining reading, stories and learning for children. Serial picture books, such as simulated comic books or storybooks, may be created wherein one or more pictures and/or text passages are arranged chronologically according to a storyline in a series on a page or multiple pages so as to relate a particular story about certain characters, objects or concepts which are the subject of the story. The present invention allows the creation of a unique interactive story book created using actual photographs/images of the park patrons or play participants themselves as they play in, on or around the facility and/or play structures. The interactive storybook relates a particular story using actual pictures and/or images of play participants (either posed or unposed) combined with other pictures, images, and/or cartoons. In this manner, the play participants themselves become actual characters in the storybook and become part of the storyline.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which.

DETAILED DESCRIPTION OF THE PREFERRED EMBODIMENTS

Figure 1:
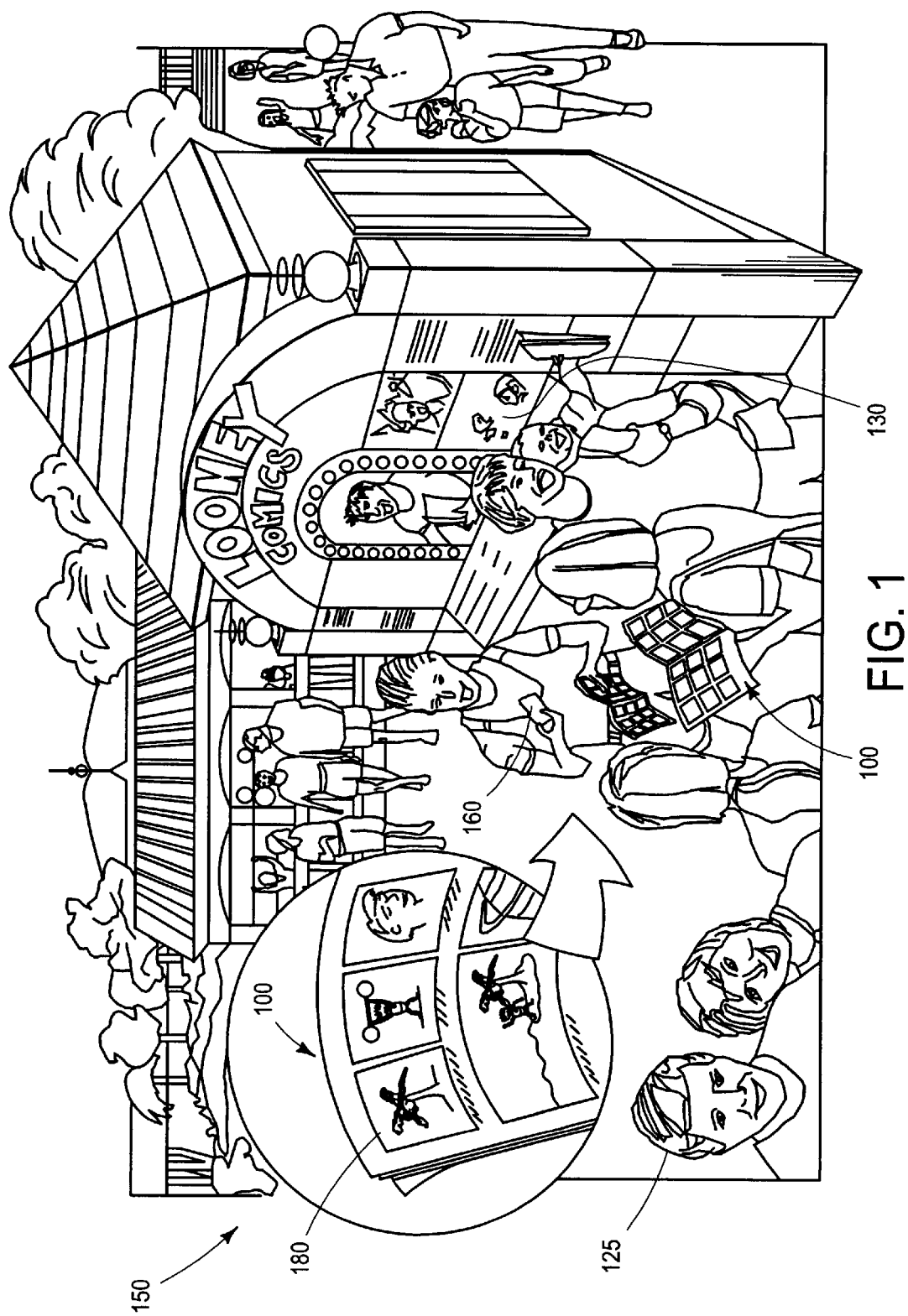
FIG. 1 is a perspective and partial schematic view of an automated photo image capture and retrieval system and interactive story book having features and advantages in accordance with the present invention.

The present invention provides an improved system and method for automated photo/video capture and retrieval using unique person identifiers or RFID (Radio Frequency Identification) tags. Such system and method allows automated capturing and indexing of individual or group photo/video images according to each unique person and/or group identifier.

Preferably one or more RFID tags or other suitable machine-readable tags are worn by each park patron during their visit to the park or other entertainment facility. Each RFID tag contains a unique person identifier number ("UPIN") which is used to match the particular individual to any relevant captured photo images that contains that individual. Optionally, each tag may also include a unique group identifier number ("UGIN") which may be used to match a defined group of individuals to any relevant captured photo images that contain any individual(s) within the defined group.

Readers are distributed throughout the park or entertainment facility and are able to read the RFID tags. Preferably the readers are capable of reading each tag (and/or multiple tags) over a read distance of anywhere from 4"–60" or more and in a manner that does not require an overt act by the park patron. Suitable tags and readers are available from RFID, Inc. under the Taggit™ brand. Alternatively, a variety of other suitable tags and readers can be used, included barcode, magnetic-strip cards, and the like.

The UPIN and UGIN information can be conveniently read and provided to an associated photo/video capture system for purposes of providing indexing of captured photo/video images according to the UPIN and UGIN of any individuals standing within the field of view of the camera. The ability to index and retrieve captured photo images according to UPIN and UGIN provides flexibility and convenience to park patrons and increased efficiency and reduced operating costs for the facility owner. It also creates unique opportunities for further value-added image processing, products and services. For example, captured photo images may be selectively retrieved and organized into a convenient photo/video album which provides a photo record of a family's or group's adventures at the park or other entertainment facility. This can be purchased by park patrons in paper/book form or it may be subsequently accessed and/or downloaded by computer over the world-wide-web or other suitable internet system.

Unique picture storybooks can also be provided using selected "gag" or "novelty" photo images taken throughout the facility and/or by using digital photo image processing to create a particular desired storybook. Such picture storybooks provide amusing and entertaining reading, stories and learning for children. Serial picture books, such as simulated comic books or storybooks, may be created wherein one or more pictures and/or text passages are arranged chronologically according to a storyline in a series on a page or multiple pages so as to relate a particular story about certain characters, objects or concepts which are the subject of the story. The present invention allows the creation of a unique interactive story book created using actual photographs/images of the park patrons or play participants themselves as they play in, on or around the facility and/or play structures. The interactive storybook relates a particular story using actual pictures and/or images of play participants (either posed or unposed) combined with other pictures, images, and/or cartoons. In this manner, the play participants themselves become actual characters in the storybook and become part of the storyline.

Figure 2:
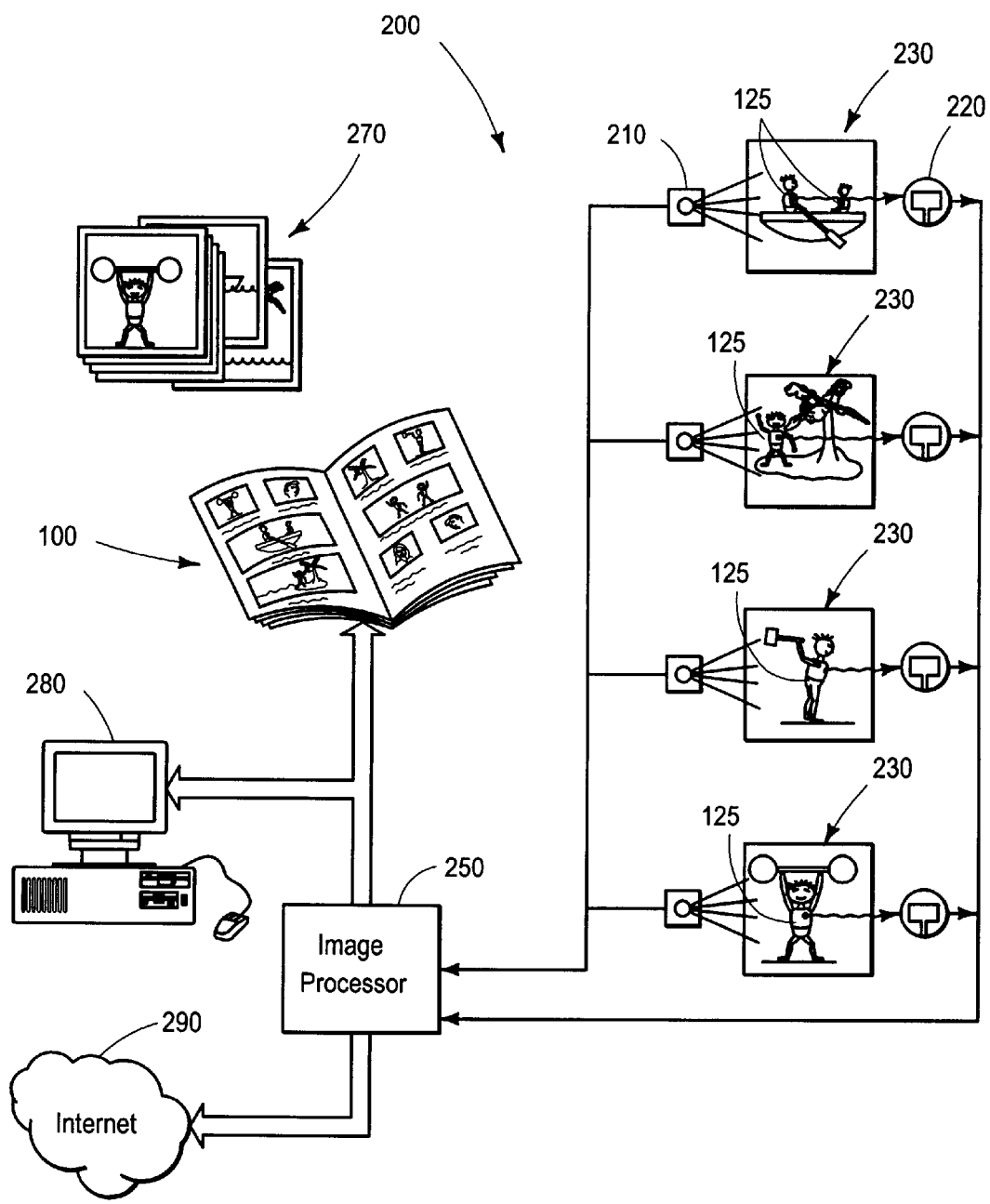
FIG. 2 is schematic system overview of the automated photo image capture and retrieval system of FIG. 1.

FIGS. 1 and 2 are perspective and partial schematic view of an automated photo image capture and retrieval system 200 and interactive story book 100 having features and advantages in accordance with the present invention. In this particular embodiment, the photo image capture and retrieval system is implemented commercially by a theme park to create a personalized interactive comic booked called "Looney Tunes™ Tooned-In Comic". Guests 125 in an entertainment park or other facility 150 are transformed into a personalized cartoon story through the use of photo/image capturing, interactive rides and interactive scenes. Using a suitable tracking system, such as bar code badges 160, radio frequency sensors, smart cards and/or the like, guests 125 are tracked as they interact with over a dozen specially designed interactive play "scenes." Their photos are taken at each scene. Thereafter, the photos are digitally transformed into one or more preexisting photographs, scenes or cartoon images 180. When the guests leave the play facility, they may retrieve or purchase their storybook 100, which causes the whole interactive experience to come alive with interactive scenes, photo images of themselves alongside their favorite characters and/or other surprises. The system preferably allows for either an individual and/or an entire family or group of people to take part in creating a single or multiple cartoon story books with each individual starring in a separate "roles" or character within the story.

Preferably, sample story books are displayed at the entrance of the family entertainment facility and/or at a special kiosk 130, and illustrates how play participants can be transformed into a 5–8 page comic book. There would preferably be 3–5 versions of comic books or storylines to choose from, each having a different story line and/or characters.

Guests preferably purchase a comic-link card 160, badge or other identification/tracking device and fill out a brief information form. The cards are used track the guests as they go from activity to activity capturing their image. For example, these cards could work by radio frequency, which reads a stored unique identification code from up to 30 feet away or a simple smart card that has a magnetic strip read by a reader. Preferably, the use of the cards 160 or other identification devices are functionally transparent to the user and require little or no action by the user to activate.

Guests are visually told through explicit signage when they need to "pose" for a photo or when their photo is being taken while on a ride. Each "scene" is set up to capture a specific image, which is needed to complete the story. Guests generally understand how each photo opportunity will be used to complete their comic book, but not entirely. There are several surprises that will be imaged in ways that are not readily apparent when the photograph is taken, including characters, special effects and other friends or family. Some of the scenes are literal such as standing under an oversized anvil. Other scenes may be blue screen shots, which digitally capture the image of the guests and then allows them to be transformed into another image or cartoon. After the guests have completed their photo activities they bring their card to a special booth or kiosk. The card or other identifying device is scanned or otherwise read by a computer, which identifies the relevant pictures stored on a digital storage medium, such as a computer hard drive. The computer then transforms the images, as discussed above, to create and print out a personalized comic.

In operation, guests are shown three different Looney tune comic books and they choose and purchase the story they want to be transformed into. They are given their tracking badge/device which has an adhesive or clip so it can be affixed to a shirt, blouse or the like. As the guests 125 go throughout the theme park they are notified that they need to partake in a photo scene 230 by a flashing sign or voice-over command. The guest then enters the scene and participates in the photo opportunity. A camera 210 then takes a photograph of the subject(s) in the photo scene 230. Note that photo capturing at the various scenes 230 doesn't need to happen within any predetermined sequence and, therefore, the guest can advantageously participant and have their photos taken at anytime and in any order during their play experience.

There may be 6–12 different photo capturing opportunities and guests can even make a game or competition to see who can find the different photo sites first and complete their mission similar to a scavenger hunt. Photo capturing opportunities may be as follows:

(1) Stand in front of a large blue screen and hold a sign that says, "HELP!" (permanently stuck to the floor). Later the guest will be transformed into a scene in which Roadrunner is standing on a cliff and you are in midair ready to fall into the canyon.

(2) Straddle a large rocket ship and you are being chased by Marvin the Martian in the photo comic book.

(3) Ride an airplane ride and be transformed into a wild chase scene with another character (all rides can have this feature).

(4) Push down on a dynamite box handle and "think" you are blowing up someone else but instead you blow up yourself in the interactive storybook (you are blackened and smoldering in the actual photo).

(5) Stand in Tweety's cage and later in the comic book you are seen next to Sylvester's big head and paw trying to get you.

(6) Do the Mexican hat dance (real music, etc.) and you are transformed into a scene with Speedy and are the size of a mouse.

(7) You lean over a balcony and give Penelope a big kiss on the hand. Later you are transformed into a scene which gives you a skunk tail, smell cloud and half your family is fainting on the floor behind you (using another photo scene for the family).

(8) Stand against a wall within a specific outline of a body and later you are transformed into several spots in the comic such as fainting scene (see above) crushed into a canyon wall (like poor ol Wile), etc.

(9) Stand inside a big bow which shows you in the comic book prepared to shoot into the sky.

(10) Stand and peek around a big brick wall.

(11) Stand next to Daffy and get a surprise squirt and your surprised reaction is captured in the photo and used in the comic book.

(13) Crawl inside a big tube with your head and chest sticking out, hold a carrot and later in your photo Bugs will join you in Warner Brothers' signature sign-off: "THAT'S ALL FOLKS!"

At each photo scene 200 and prior to capturing each photo/video image a reader 220 preferably reads the tag of each person substantially within view of the camera. As noted above, each tag contains a unique person identifier number ("UPIN") which is used to match the particular individual to any relevant captured photo images that contains that individual. Optionally, each tag may also include a unique group identifier number ("UGIN") which may be used to match a defined group of individuals to any relevant captured photo images that contain any individual(s) within the defined group. Once the UPIN and UGIN of each tag in the field of view of the camera is determined, the automated photo capture is caused to take place.

The resulting photo image and associated UGIN and UPIN information is then transmitted or otherwise communicated to an image processor 250. The image processor 250 stores the captured photo/video images and indexes them according to the UPIN and UGIN information such that each image may be subsequently retrieved. When the guests are ready to leave the park, they take their badge/card to the exit and within a few minutes their personalized comic is printed. Using conventional digital image processing techniques, the photos are turned into a cartoon comic or storybook 100 chosen by the guest. They may have been captured into the ACME TEST SUBJECT Cartoon, which tells the story of the guest being personally invited to test out the latest in Acme gadgets. To the surprise of the guests they are joined by their favorite characters that just happened to be there that day. Of course the characters can't help themselves to mischief and true to the Looney's personalities they include the guests in their antics.

Captured photos may also be retrieved and printed as individual hard copies 270 for the guest(s) according to UPI and UGIN, as desired. Optionally, captured photo/video images may be distributed to one or more computer photo processing stations 280 distributed throughout a facility whereby park patrons may access and print selected photos of themselves, their family and friends. The photo processing station preferably includes standard photo processing functions, such as cropping, enlargements, digital filters and the like, as well as any number of fan add-on effects, such as comic-book creation, story-book creation, animations as desired. If desired, the photo processing stations 280 may be coin-operated, debit card-operated, or operated by or with the assistance of park personnel. Captured photos may also be retrieved and printed over the internet 290 as individual photos/videos or photo/video albums according to UPIN and UGIN, as desired. Thus, park patrons and their family and friends may simply view and/or download any desired photo images from their home computers using the work wide web.

Figure 3B:
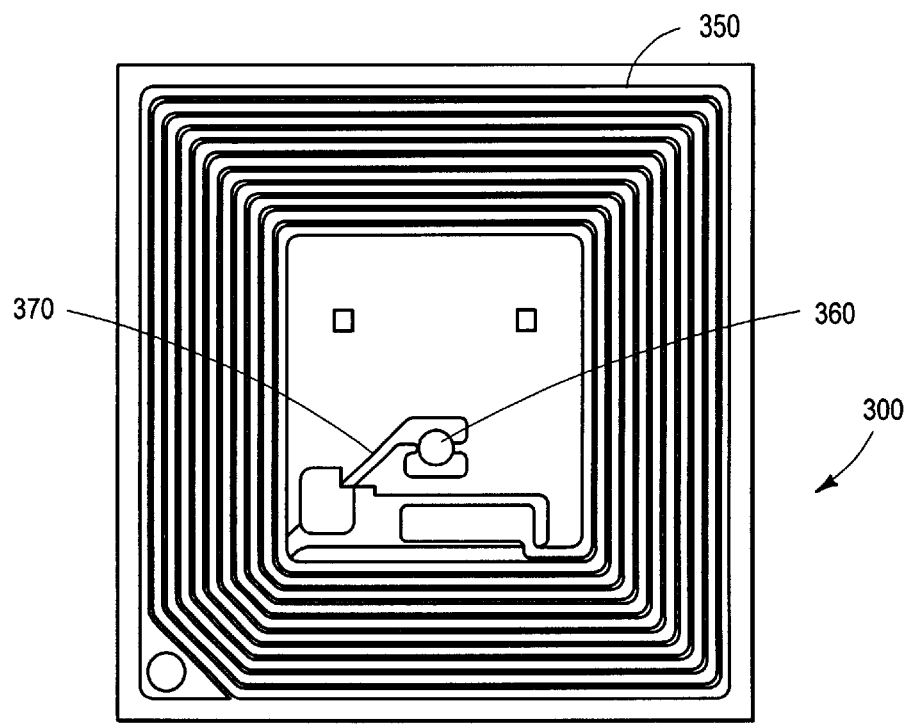
FIGS. 3A and 3B are front and rear views, respectively, of an RFID tag for use with the automated photo image capture and retrieval system of FIG. 1 and having features and advantages in accordance with the present invention.
Figure 3A:
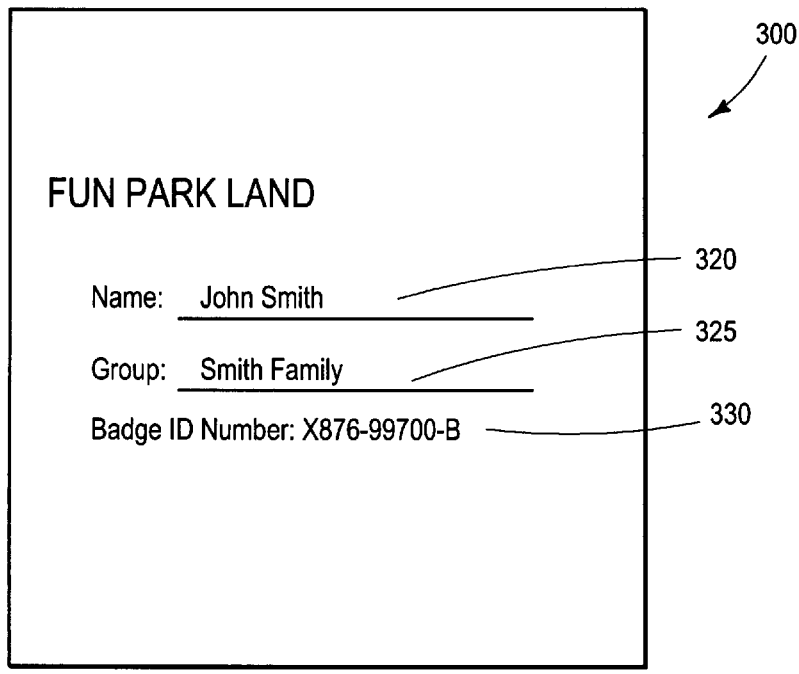

FIGS. 3A and 3B are front and rear views, respectively, of one embodiment of an RFID tag 300 for use with the automated photo image capture and retrieval system of FIGS. 1 and 2 and having features and advantages in accordance with the present invention. The particular tag illustrated is sold under the brand name Taggit™ and is available from TIRIS, a division of Texas Instruments, Inc. The tag 300 and various associated readers are commercially available in a wide variety of configurations, sizes and read ranges. RFID tags having a read range of between about 5" and 60" are particularly preferred, although shorter or longer read ranges may also be acceptable.

The particular tag 300 illustrated is intended to be affixed or adhered to the front of a shirt or blouse worn by a park patron. The front of the tag may include any number of designs or other information pertinent to its application. For example, the guest's name 320 and group affiliation 325 may be indicated for convenient reference. The tag's unique person identification number (UPIN) and/or unique group identification number (UGIN) may also be displayed as a badge number 330. The obverse side of the tag 300 contains the tag electronics. This generally comprises a spiral wound antenna, a radio frequency transmitter chip 360 and various electrical leads and terminals 370 connecting the chip 360 to the antenna.

The tag 300 is activated by a radio frequency signal that is broadcast by an adjacent reader or activation device. The signal impresses a voltage upon the antenna 350, which is then used to power the chip 360. When activated, the chip 360 transmits via radio frequency a unique identification number corresponding to the UPIN and/or UGIN. This signal is then received and processed by the associated reader as described above. If desired, the tag 300 may also be configured for read/write communications with an associated reader/writer. Thus, the unique tag identifier number (UPIN or UGIN) can be changed or other information may be added to the tag 300, as needed or desired.

Figure 4:
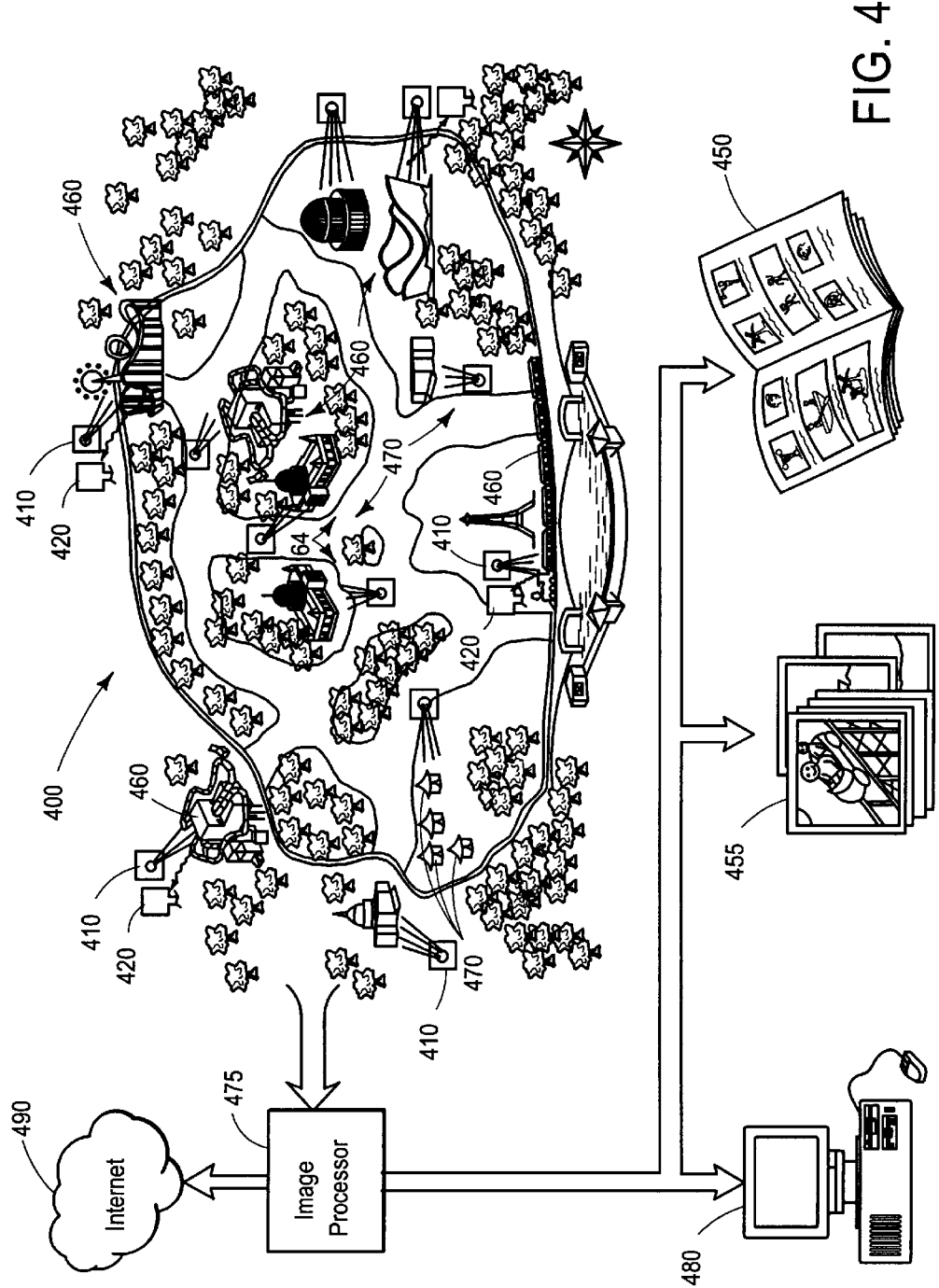
FIG. 4 is an aerial perspective and partial schematic view of an alternative embodiment of an automated photo image capture and retrieval system adapted for use in a theme park and having advantages in accordance with the present invention.

FIG. 4 is an aerial perspective and partial schematic view of an alternative embodiment of an automated photo image capture and retrieval system 400 adapted for use in a theme park comprising various rides 460 and play structures 470. As with the systems described above, one or more RFID tags or other suitable machine-readable tags (not illustrated) are worn by each park patron during their visit to the theme park. Each RFID tag contains a unique person identifier number ("UPIN") which is used to match the particular individual to any relevant captured photo images that contains that individual. Optionally, each tag includes a unique group identifier number ("UGIN") which may be used to match a defined group of individuals to any relevant captured photo images that contain any individual(s) within the defined group.

Readers 420 are distributed throughout the park facility and are able to read the RFID tags. Preferably the readers are capable of reading each tag (and/or multiple tags) over a read distance of anywhere from 4–60" or more and in a manner that does not require an overt act by the park patron. The UPIN and UGIN information can be conveniently read and provided to an associated photo/video capture system for purposes of providing indexing of captured photo/video images according to the UPIN and UGIN of any individuals standing within the field of view of an associated camera 410. The ability to index and retrieve captured photo images according to UPIN and UGIN provides flexibility and convenience to park patrons and increased efficiency and reduced operating costs for the facility owner. Thus, captured photo images may be selectively retrieved and organized into a convenient photo/video album 450 which provides a photo record of a family's or group's adventures at the park or other entertainment facility. This can be purchased by park patrons in paper/book form or it may be subsequently accessed and/or downloaded by computer over the world-wide-web 490 or other suitable internet system.

As with the above-described system, unique picture storybooks can also be provided using selected "gag" or "novelty" photo images taken throughout the park facility and/or by using digital photo image processing to create a particular desired storybook. Such picture storybooks provide amusing and entertaining reading, stories and learning for children. Serial picture books, such as simulated comic books or storybooks, may be created wherein one or more pictures and/or text passages are arranged chronologically according to a storyline in a series on a page or multiple pages so as to relate a particular story about certain characters, objects or concepts which are the subject of the story. This allows the creation of a unique interactive story book 450 created using actual photographs/images of the park patrons or play participants themselves as they play in, on or around the facility and/or play structures. The interactive storybook relates a particular story using actual pictures and/or images of play participants (either posed or unposed) combined with other pictures, images, and/or cartoons. In this manner, the play participants themselves become actual characters in the storybook and become part of the storyline.

When the guests leave the play facility, they may retrieve or purchase their storybook 450, which causes the whole interactive experience to come alive with interactive scenes, photo images of themselves alongside their favorite characters and/or other surprises. The system preferably allows for either an individual and/or an entire family or group of people to take part in creating a single or multiple cartoon story books 450 with each individual starring in a separate "roles" or character within the story.

Throughout the park guests are visually told through explicit signage when they can "pose" for a photo or when their photo is being taken while on a ride. Each photo opportunity is preferably set up to capture a specific image. Guests generally understand how each photo opportunity will be used to complete their comic book, but not entirely. There are several surprises that will be imaged in ways that are not readily apparent when the photograph is taken, including characters, special effects and other friends or family. Some of the scenes are literal such as standing under an oversized anvil. Other scenes may be blue screen shots, which digitally capture the image of the guests and then allows them to be transformed into another image or cartoon. After the guests have completed their photo activities they bring their card to a special booth or kiosk. The UPIN and/or UGIN recorded on the card is scanned or otherwise read by a reader and associated computer, which identifies the relevant pictures stored on a digital storage medium, such as a computer hard drive. The computer then transforms the images, as discussed above, to create and print out a personalized photo album and/or comic book.

In operation, guests are given their tracking badge/device which has an adhesive or clip so it can be affixed to a shirt, blouse or the like. As the guests go throughout the theme park they are notified that they can partake in a photo scene by a flashing sign or voice-over command. The guest then enters the scene and participates in the photo opportunity. A camera 410 then takes a photograph of the subject(s) in the photo scene. Note that photo capturing at the various scenes doesn't need to happen within any predetermined sequence and, therefore, the guest can advantageously participant and have their photos taken at anytime and in any order during their play experience.

There may be many different photo capturing opportunities throughout the park and guests can even make a game or competition to see who can find the different photo sites first and complete their mission similar to a scavenger hunt. At each photo scene and prior to capturing each photo/video image a reader 420 preferably reads the tag of each person substantially within view of the camera. Once the UPIN and UGIN of each tag in the field of view of the camera is determined, the automated photo capture is caused to take place.

The resulting photo image and associated UGIN and UPIN information is then transmitted or otherwise communicated to an image processor 475. The image processor 475 stores the captured photo/video images and indexes them according to the UPIN and UGIN information such that each image may be subsequently retrieved. When the guests are ready to leave the park, they take their badge/card to the exit and within a few minutes their personalized photo album or comic is printed. Using conventional digital image processing techniques, the photos can be turned into a cartoon comic or storybook 450 chosen by the guest.

Captured photos may also be retrieved and printed as individual hard copies 455 for the guest(s) according to UPIN and UGIN, as desired. Optionally, captured photo/video images may be distributed to one or more computer photo processing stations 480 distributed throughout a facility whereby park patrons may access and print selected photos of themselves, their family and friends. The photo processing station 480 preferably includes standard photo processing functions, such as cropping, enlargements, digital filters and the like, as well as any number of fin add-on effects, such as comic-book creation, story-book creation, animations as desired. If desired, the photo processing stations 480 may be coin-operated, debit card-operated, or operated by or with the assistance of park personnel. Captured photos may also be retrieved and printed over the internet 490 as individual photos/videos or photo/video albums according to UPIN and UGIN, as desired. Thus, park patrons and their family and friends may simply view and/or download any desired photo images from their home computers using the work wide web.

Figure 5:
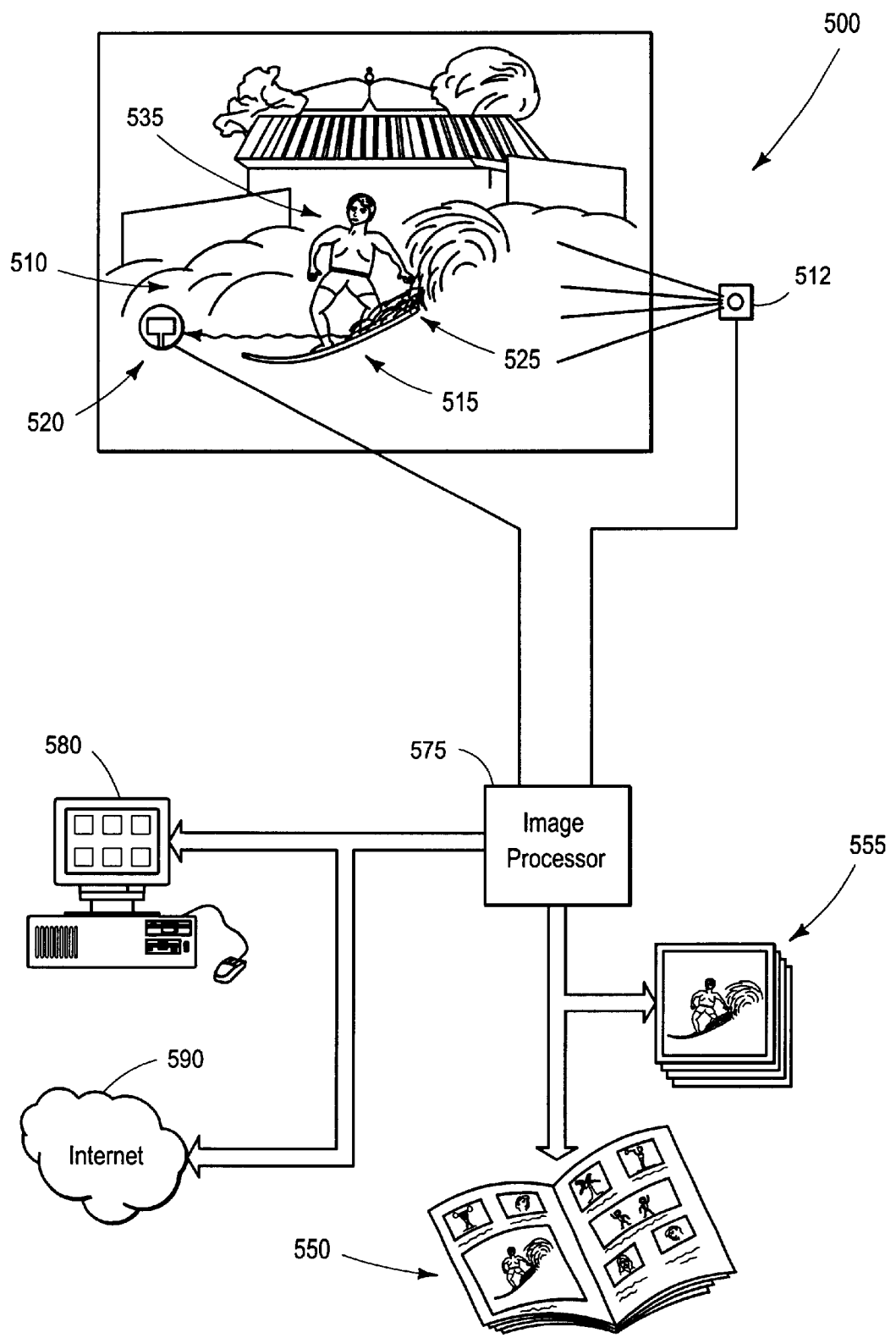
FIG. 5 is a front perspective and partial schematic view of an alternative embodiment of an automated photo image capture and retrieval system adapted for use with a sheet flow surfing ride attraction and having advantages in accordance with the present invention.
Figure 6A:
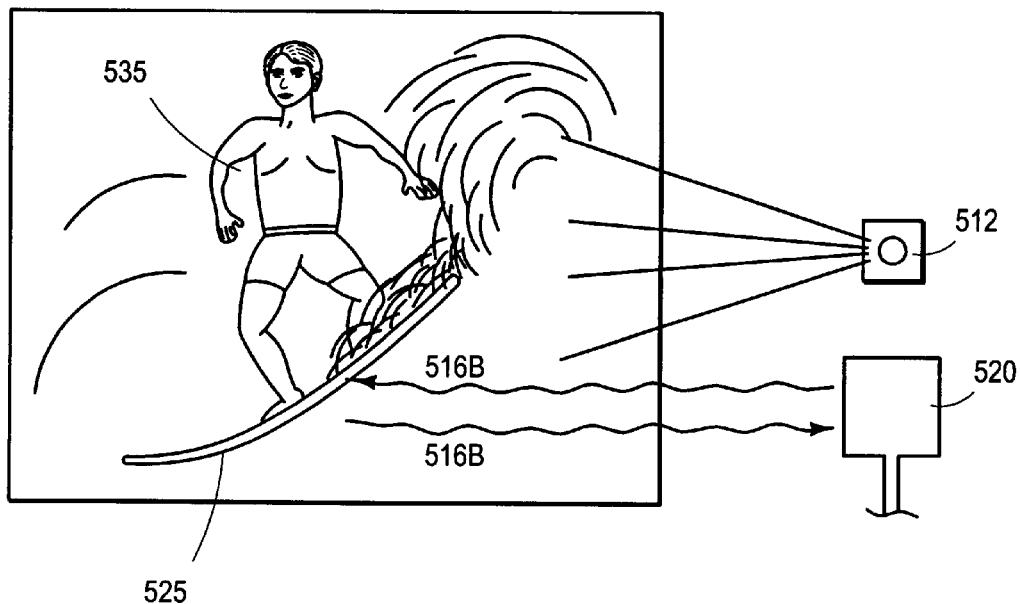
FIG. 6A is a front perspective and partial schematic view of an alternative embodiment of an automated photo image capture and retrieval system adapted for use with a sheet flow surfing ride attraction and having features and advantage in accordance with the present invention.
Figure 6B:
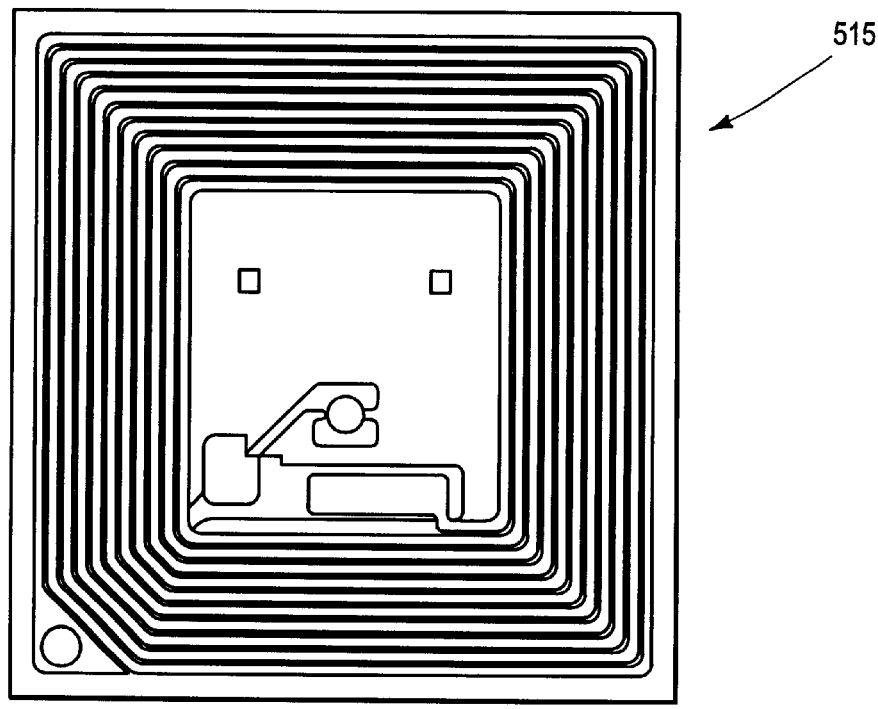
FIG. 6B is a detail view of an RFID tag for use with the automated photo image capture and retrieval system of FIG. 6A and having features and advantages in accordance with the present invention.

FIGS. 5 and 6 are perspective and partial schematic view of an alternative embodiment of an automated photo image capture and retrieval system 500 adapted for use with a sheet flow water ride 510 or similar attraction such as described at http:\\www.wavehouse.com. As with the automated photo/video capture and retrieval systems described above, one or more RFID tags or other suitable machine-readable tags (not illustrated) are worn by each ride participant throughout an event, such as a competitive flow-boarding event. Alternatively, each tag 515 may be temporarily or permanently associated with a flow board 525 upon which each rider 535 rides. Each RFID tag 515 contains a unique person identifier number ("UPIN") which is used to match the particular individual to any relevant captured photo images that contains that individual. Optionally, each tag includes a unique group identifier number ("UGIN") which may be used to match a defined group or team of individuals to any relevant captured photo images that contain any individual(s) within the defined group.

Readers 520 are distributed on or adjacent (preferably behind) the ride attraction 510 such that they are able to read the RFID tags 515. Preferably the readers are capable of reading each tag (and/or multiple tags) over a relatively long read distance of anywhere from 5'–20' or more and in a manner that does not require an overt act by the rider. Suitable long-range RF tags and readers may be obtained from a number of suitable sources, such as AXCESS, Inc. and, in particular, the AXCESS active RFID network system for asset and people tacking applications.

During ride operation the UPIN and UGIN information can be conveniently read and provided to an associated photo/video capture system for purposes of providing indexing of captured photo/video images according to the UPIN and UGIN of any individuals riding upon the ride 510 who are within the field of view of an associated camera 512. Prior to capturing each photo/video image a reader 520 preferably reads the tag of each rider substantially within view of the camera. Once the UPIN and UGIN of each tag in the field of view of the camera is determined, the automated photo/video capture is caused to take place.

The resulting photo image and associated UGIN and UPIN information is then transmitted or otherwise communicated to an image processor 575. The image processor 575 stores the captured photo/video images and indexes them according to the UPIN and UGIN information such that each image may be subsequently retrieved. When the guests are ready to leave the park, they take their badge/card to the exit and within a few minutes their personalized photo album is printed.

The ability to index and retrieve captured photo images according to UPIN and UGIN provides flexibility and convenience to ride patrons and increased efficiency and reduced operating costs for the ride operator. Thus, captured photo images may be selectively retrieved and organized into a convenient photo/video album 550 which provides a photo record of a ride participant's or team's best performances, wipe outs, etc. during an event. This can be purchased by the riders in paper/book form or it may be subsequently accessed and/or downloaded by computer over the world-wide-web 590 or other suitable internet system.

Captured photos may also be retrieved and printed as individual hard copies 555 for the guest(s) according to UPIN and UGIN, as desired. Optionally, captured photo/video images may be distributed to one or more computer photo processing stations 580 distributed throughout a facility whereby ride participants may access and print selected photos of themselves, their family and friends. The photo processing station 580 preferably includes standard photo processing functions, such as cropping, enlargements, digital filters and the like, as well as any number of fun add-on effects, such as framing, animation, text/voice balloons/bubbles, etc., as desired. If desired, the photo processing stations 580 may be coin-operated, debit card-operated, or operated by or with the assistance of park personnel. Captured photos may also be retrieved and printed over the internet 590 as individual photos/videos or photo/video albums according to UPIN and UGIN, as desired. Thus, ride patrons and their family and friends may simply view and/or download any desired photo images from their home computers using the work wide web.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. An automated photo capture and retrieval system for automatically capturing and indexing photo images of multiple individuals or groups of individuals within a facility comprising:

one or more tags adapted to be worn by each individual or group of individuals desired to be photo imaged, each tag comprising a unique person identifier ("UPIN") for identifying the associated individuals and a unique group identifier number ("UGIN") which may be used to match a defined group of individuals to any relevant captured photo images that contain any individual(s) within the defined group;

one or more cameras distributed throughout the facility adapted to automatically capture photo and/or video images of one or more individuals in the field of view of the camera;

one or more readers distributed throughout the facility and associated with each camera, each said readers being adapted to read each tag of each individual substantially within the field of view of each associated camera and to determine the unique person and/or group identifier for each tag; and an image processor to receive each captured photo image and all associated unique person and/or group identifiers and to record or each captured photo image and associated unique person and/or group identifiers such that each image may be retrieved according to its associated unique person and/or group identifiers.

2. The automated photo capture and retrieval system of claim 1 wherein said tags comprise one or more RFID tags.

3. The automated photo capture and retrieval system of claim 1 wherein each RFID tag may be read over a read distance of from about 4"–60".

4. A method for creating an interactive story book using an automated photo capture and retrieval system, comprising the following steps:

applying a readable tag to an individual or group of individuals, each tag comprising a unique person and/or group identifier for identifying each associated individual and which may be used to match each individual or group of individuals to any relevant captured photo images;

providing one or more cameras to capture photo images of the individual or group of individuals;

using one or more readers to read each tag within the field of view of each associated camera and to determine the unique person and/or group identifier for each tag;

transmitting each captured image and associated unique person and/or group identifiers to an image processor; and organizing the captured images into s simulated comic book or storybook comprising an arrangement of one or more captured images of predetermined scenes or cartoons relating to a particular desired story line, wherein images of one or more individuals in different scenes and/or poses are incorporated into the predetermined scenes or cartoons to create the interactive storybook.

5. The method of claim 4 wherein said sport comprises competitive flow boarding on a sheet flow water ride and wherein said tags are provided on flow boards used by each sport participant.

6. The method of claim 5 wherein at least one reader is provided on or underneath a ride surface of said sheet flow water ride and adapted to read said tags provided on each said flow board.

7. A method for creating index-retrievable images of one or more individuals participating in a sporting event using an automated photo capture and retrieval system, comprising the following steps:

providing a readable tag to each individual or group of individuals participating in said sporting event, each tag comprising a unique person and/or group identifier for identifying each associated individual and which may be used to match each individual or group the following steps;

providing one or more cameras to capture photo images of individuals or groups of individuals participating in said sporting event;

using one or more readers to read each tag within the field of view of each associated camera and to thereby determine the unique person and/or group identifier for each tag;

transmitting each captured image and each determined unique person and/or group identifiers to an image processor; and using the image processor to organize and store captured images according to each unique person identifier whereby relevant stored images of individual and/or group sport participants may be retrieved using said unique person and/or group identifier.

* * * * *